United States Patent
Montemerlo et al.

(10) Patent No.: US 11,181,384 B2
(45) Date of Patent: Nov. 23, 2021

(54) VERIFYING MAP DATA USING CHALLENGE QUESTIONS

(71) Applicant: Waymo LLC, Mountain View, CA (US)

(72) Inventors: Michael Steven Montemerlo, Mountain View, CA (US); Ming Ji, Sunnyvale, CA (US); Peter Pawlowski, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 133 days.

(21) Appl. No.: 16/042,184

(22) Filed: Jul. 23, 2018

(65) Prior Publication Data
US 2020/0025577 A1 Jan. 23, 2020

(51) Int. Cl.
*G01C 21/32* (2006.01)
*G06K 9/00* (2006.01)
*G06F 16/29* (2019.01)
*G06F 16/58* (2019.01)

(52) U.S. Cl.
CPC .......... *G01C 21/32* (2013.01); *G06F 16/29* (2019.01); *G06F 16/58* (2019.01); *G06K 9/00825* (2013.01)

(58) Field of Classification Search
CPC ......... G01C 21/32; G06F 16/29; G06F 16/58; G06K 9/00825
See application file for complete search history.

(56) References Cited

U.S. PATENT DOCUMENTS

| | | | |
|---|---|---|---|
| 9,402,189 B2 | 7/2016 | Hohs et al. | |
| 9,541,414 B2 | 1/2017 | Gruijters et al. | |
| 9,672,240 B2 | 6/2017 | Fefilatyev et al. | |
| 2005/0209781 A1 | 9/2005 | Anderson | |
| 2012/0123959 A1 | 5/2012 | Davis et al. | |
| 2014/0236937 A1 | 8/2014 | Hohs | |
| 2015/0141056 A1* | 5/2015 | Fefilatyev | H04W 4/021 455/456.3 |
| 2016/0364989 A1* | 12/2016 | Speasl | B64C 39/024 |
| 2018/0150764 A1* | 5/2018 | Stenneth | G01C 21/00 |
| 2018/0174446 A1* | 6/2018 | Wang | G08G 1/0112 |

FOREIGN PATENT DOCUMENTS

CN 10309087 5/2013

OTHER PUBLICATIONS

PCT ISR and WO for International Application No. PCT/US2019/042781 dated Nov. 8, 2019, 9 pages.

* cited by examiner

*Primary Examiner* — Yuen Wong
(74) *Attorney, Agent, or Firm* — Botos Churchill IP Law

(57) ABSTRACT

Aspects of the disclosure relate to validating map data using challenge questions. For instance, an attributes to be validated may be identified from the map data. At least one challenge question may be selected from a plurality of predetermined challenge questions based on the attribute. An image may be retrieved based on image information associated with the at least one challenge question. The image and the at least one challenge question may be provided for display. In response to the providing, operator input identifying an answer to the at least one challenge question may be received. This answer may be then used to validate the attribute.

21 Claims, 9 Drawing Sheets

VERIFYING MAP DATA USING CHALLENGE QUESTIONS

BACKGROUND

Various systems may reliable upon highly detailed maps of the environment. For instance, some autonomous vehicles rely upon these maps to make driving decisions. The better and more accurate the map, the more reliable those decisions may be. Therefore the accuracy and quality of these maps can be critically important to the safety of such autonomous vehicles.

SUMMARY

Aspects of the disclosure provides a method for validating map data using challenge questions. The method includes identifying, by one or more processors, an attribute to be validated from the map data; selecting, by the one or more processors, from a plurality of predetermined challenge questions at least one challenge question based on the attribute; retrieving, by the one or more processors, an image based on image information associated with the at least one challenge question; providing for display, by the one or more processors, the image and the at least one challenge question; in response to the providing, receiving, by the one or more processors, operator input identifying an answer to the at least one challenge question; and using, by the one or more processors, the answer to validate the attribute.

In one example, the attribute corresponds to whether a right turn during a red light is permitted at an intersection. In another example, the image information defines instructions for retrieving a camera image from log data. In this example, the instructions identify an angle and a position for the camera image. In another example, the method also includes providing options for an operator to zoom in or out of a displayed image. In another example, the method also includes providing an option for an operator to request another image in order to answer the at least one challenge question. In another example, the at least one challenge question requests an operator to verify whether a right turn can be made during a red light at an intersection. In another example, the at least one challenge question requests an operator to verify whether two lanes are connected to one another so as to allow a turn. In another example, the at least one challenge question requests an operator to verify whether a particular traffic light controls traffic in a particular lane. In another example, the at least one challenge question requests an operator to verify whether an intersection has any traffic lights. In another example, the method also includes comparing the answer to other answers received for the at least one challenge question, and wherein validating the map data is further based on the comparison. In this example, validating the attribute is further based on a total number of consistent answers from the answer and the other answer. In addition, validating the attribute is further based on comparing the total number of consistent answers to a threshold value. In another example, the method also includes using the answer to correct the map data. In another example, the method also includes using the answer as a label for input into a machine learning model in order to train the model to verify other map data. In this example, the method also includes using the machine learning model to verify the other map data.

Another aspect of the disclosure provides a system for validating map data using challenge questions. The system includes one or more processors configured to identify an attribute to be validated from the map data; select from a plurality of predetermined challenge questions at least one challenge question based on the attribute; retrieve an image based on image information associated with the at least one challenge question; provide for display the image and the at least one challenge question; in response to the providing, receive operator input identifying an answer to the at least one challenge question; and use the answer to validate the attribute.

In one example, the attribute corresponds to whether a right turn during a red light is permitted at an intersection. In another example, the image information defines instructions for retrieving a camera image from log data. In another example, the one or more processors are further configured to compare the answer to other answers received for the at least one challenge question, and to validate the map data is further based on the comparison.

DETAILED DESCRIPTION

Overview

Figure 1:
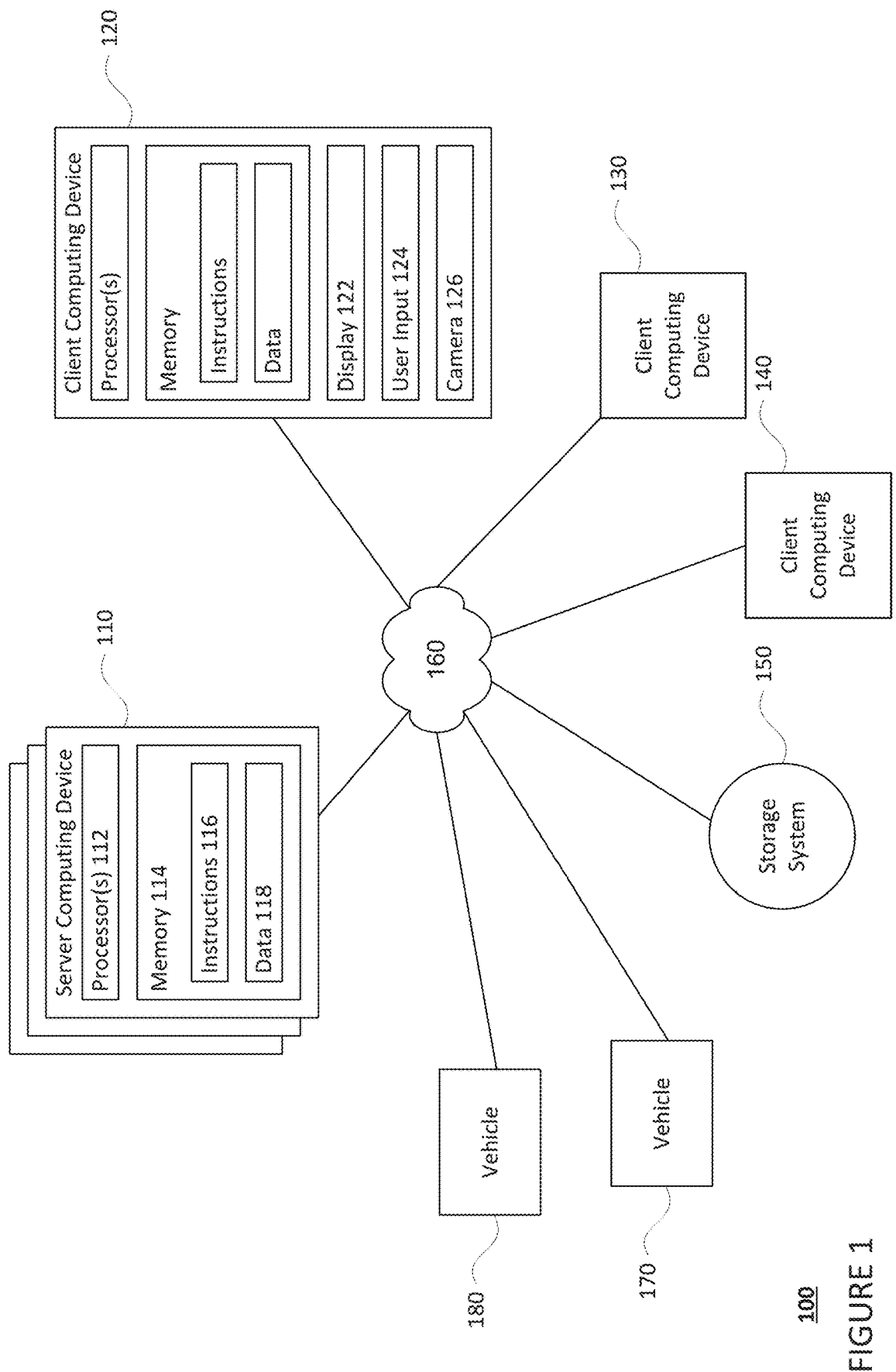
FIG. 1 is a functional diagram of an example system in accordance with aspects of the disclosure.

This technology relates to improving map quality and detail. As noted above, this can be especially important in the case of maps that are used by the computing devices of autonomous vehicles to make driving decisions. The better and more accurate the map, the more reliable those decisions may be. One quality control approach may include presenting an operator with features displayed on a "top down" view of map data and asks the operator to identify any mistakes they see. For example, an operator may check map data for an intersection to confirm whether lanes are properly connected and the lanes are all connected to the correct controls (traffic lights or stop signs). Sometimes subtle errors can be hard to see in a top down view. However, there are many attributes of map features that should be checked, and there are no guarantees that the original mapper (human or machine) set these attributes properly and that the quality control operator checked that those attributes were set properly.

In order to address these issues, rather than simply displaying a map and/or an image, a process that verifies map data using challenge questions may be used. These challenge questions may be initially generated manually and associated with one or more triggers. The triggers may correspond to attributes of the map data.

Each challenge question may also be associated with image information identifying what type of image should be displayed with the challenge question. Thus, when the challenge question is displayed, an image may be retrieved and displayed as well using the image information for that challenge question.

In operation, a computing system may review new, old, or recently updated map data in order to identify attributes. For any identified attribute, the computing system may identify one or more challenge questions. For each challenge question, an image may be identified using the image information associated with that challenge question. The image may be retrieved from data collected by a camera, for instance, mounted on a vehicle such as an autonomous vehicle.

Once the one or more challenge questions are identified and the images retrieved, these may be displayed on a display in order to allow the operator to answer the question, for instance, during a review session for the map data. The questions may be shown in a predetermined, for instance by order of importance to the map quality for instance, confirming connections of lanes to traffic lights is more important than labeling speed bumps, or in any order. In addition, a challenge question may be linked to one or more other challenge questions, for instance in a hierarchy or tree based on the answer to that challenge question. Thus, one challenge question may lead to another challenge question and so on.

The answers to the challenge questions can then be analyzed to validate the map data. For instance, the answer may be used to confirm that the attribute is correct as well as to determine how or whether to correct or update the map data. The questions could also be used for other information which might indicate that the world has changed with respect to the map data in some other way, such as confirming construction areas at intersections. In addition, the same challenge questions may be asked of different operators in order to compare the results and measure the accuracy of individual operators in reviewing specific types of attributes.

The features described herein provide for improved map quality and detail. The questions may be tailored to address questions of high importance with respect to how the map is going to be used. In other words, the questions can be used to guide the attention of the operator to checking specific attributes by identifying and displaying appropriate questions. Having such specific, tailored questions may provide fine-grained details about types of errors, mistakes, or omissions in the map data and are more likely to generate reliable answers than open-ended questions such as identify or list any mistakes. Together this information may be used to proportionally focus quality control effort on mapping errors that are most important to the behavior of vehicles. In addition, the types and numbers of questions asked is a "knob" that can be turned to affect map quality in a targeted way.

Example Systems

Figure 2:
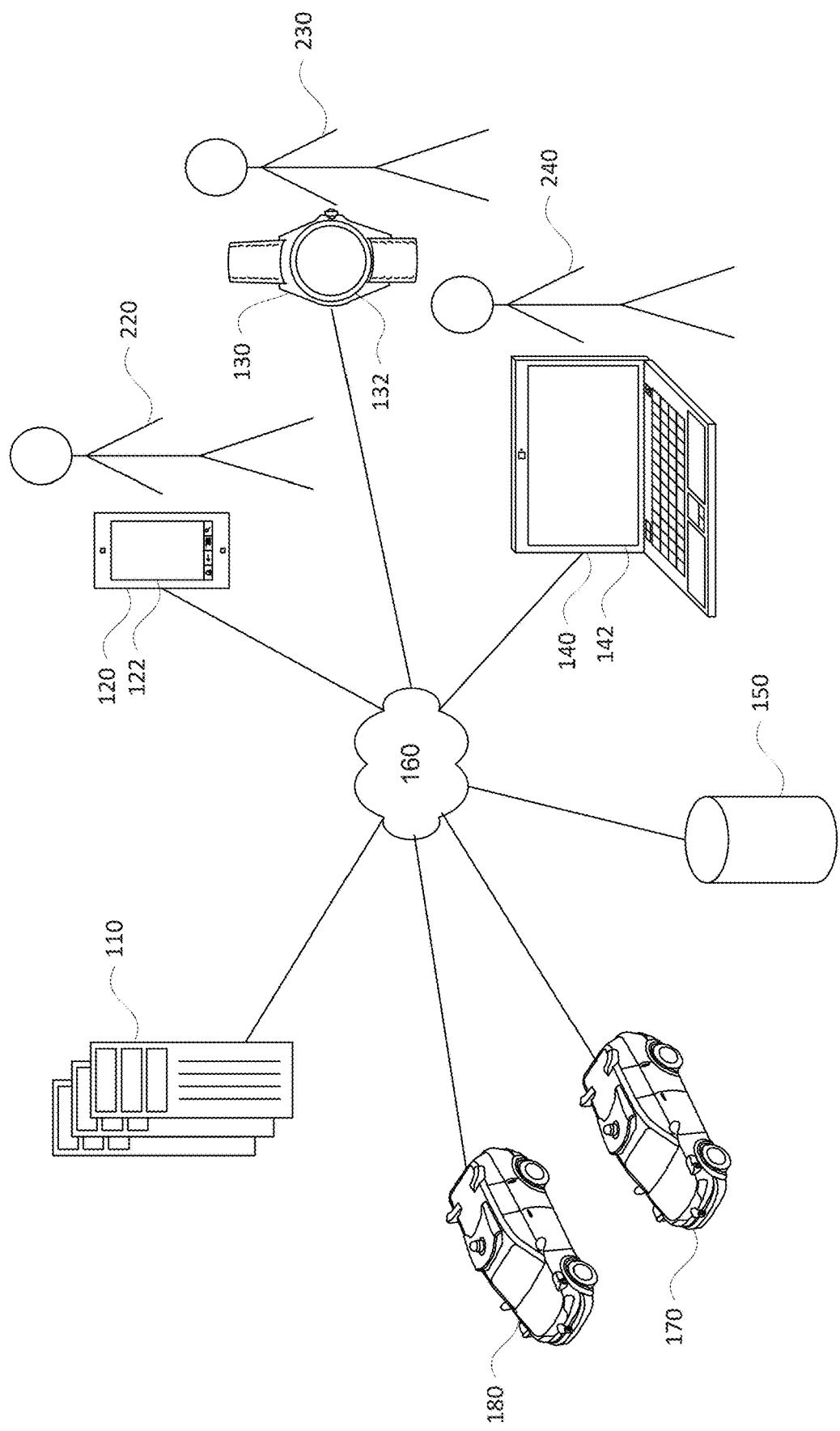
FIG. 2 is a pictorial diagram of the example system of FIG. 1.

FIGS. 1 and 2 include an example system 100 in which the features described above may be implemented. It should not be considered as limiting the scope of the disclosure or usefulness of the features described herein. In this example, system 100 can include computing devices 110, 120, 130, and 140, vehicles 170, 180, as well as storage system 150. Each computing device 110 can contain one or more processors 112, memory 114 and other components typically present in general purpose computing devices. Memory 114 of each of computing devices 110, 120, 130, and 140 can store information accessible by the one or more processors 112, including instructions 116 that can be executed by the one or more processors 112.

Memory can also include data 118 that can be retrieved, manipulated or stored by the processor. The memory can be of any non-transitory type capable of storing information accessible by the processor, such as a hard-drive, memory card, ROM, RAM, DVD, CD-ROM, write-capable, and read-only memories.

The instructions 116 can be any set of instructions to be executed directly, such as machine code, or indirectly, such as scripts, by the one or more processors. In that regard, the terms "instructions," "application," "steps," and "programs" can be used interchangeably herein. The instructions can be stored in object code format for direct processing by a processor, or in any other computing device language including scripts or collections of independent source code modules that are interpreted on demand or compiled in advance. Functions, methods, and routines of the instructions are explained in more detail below.

Data 118 may be retrieved, stored or modified by the one or more processors 112 in accordance with the instructions 116. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 112 can be any conventional processors, such as a commercially available CPU or GPU. Alternatively, the processors can be dedicated components such as an application specific integrated circuit ("ASIC") or other hardware-based processor. Although not necessary, one or more of computing devices 110 may include specialized hardware components to perform specific computing processes, such as decoding video, matching video frames with images, distorting videos, encoding distorted videos, etc. faster or more efficiently.

Although FIG. 1 functionally illustrates the processor, memory, and other elements of computing device 110 as being within the same block, the processor, computer, computing device, or memory can actually comprise multiple processors, computers, computing devices, or memories that may or may not be stored within the same physical housing. For example, the memory can be a hard drive or other storage media located in housings different from that of the computing devices 110. Accordingly, references to a processor, computer, computing device, or memory will be understood to include references to a collection of processors, computers, computing devices, or memories that may or may not operate in parallel. For example, the computing devices 110 may include server computing devices operating as a load-balanced server farm, distributed system, etc. Yet further, although some functions described below are indicated as taking place on a single computing device having a single processor, various aspects of the subject matter described herein can be implemented by a plurality of computing devices, for example, communicating information over network 160.

Each of the computing devices 110 can be at different nodes of a network 160 and capable of directly and indirectly communicating with other nodes of network 160. Although only a few computing devices are depicted in FIGS. 1-2, it should be appreciated that a typical system can include a large number of connected computing devices, with each different computing device being at a different node of the network 160. The network 160 and intervening nodes described herein can be interconnected using various protocols and systems, such that the network can be part of the Internet, World Wide Web, specific intranets, wide area networks, or local networks. The network can utilize standard communications protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

As an example, each of the computing devices 110 may include web servers capable of communicating with storage system 150 as well as computing devices 120, 130, and 140 and vehicles 170, 180 via the network. For example, one or more of server computing devices 110 may use network 160 to transmit and present information to a user or operator, such as operator 220, 230, or 240, on a display, such as displays 122, 132, or 142 of computing devices 120, 130, or 140. In this regard, computing devices 120, 130, and 140 may be considered client computing devices and may perform all or some of the features described herein.

Each of the client computing devices 120, 130, and 140 may be configured similarly to the server computing devices 110, with one or more processors, memory and instructions as described above. Each client computing device 120, 130, or 140 may be a personal computing device intended for use by an operator 220, 230, 240, and have all of the components normally used in connection with a personal computing device such as a central processing unit (CPU), memory (e.g., RAM and internal hard drives) storing data and instructions, a display such as displays 122, 132, or 142 (e.g., a monitor having a screen, a touch-screen, a projector, a television, or other device that is operable to display information), and operator input device 124 (e.g., a mouse, keyboard, touch-screen, or microphone). The client computing device may also include a camera 126 for recording video streams and/or capturing images, speakers, a network interface device, and all of the components used for connecting these elements to one another. In addition, the client computing devices may include a quality control application, stored locally at the client computing device, that may be used by a operator to initiate and conduct a validation session as discussed further below.

Although the client computing devices 120, 130, and 140 may each comprise a full-sized personal computing device, they may alternatively comprise mobile computing devices capable of wirelessly exchanging data with a server over a network such as the Internet. By way of example only, client computing device 120 may be a mobile phone or a device such as a wireless-enabled PDA, a tablet PC, or a netbook that is capable of obtaining information via the Internet. In another example, client computing device 130 may be a wearable computing device such as a watch shown in FIG. 2 or a head-mounted computing system. As an example the operator may input information using a small keyboard, a keypad, microphone, using visual signals with a camera, or a touch screen.

Each of the vehicles 170 and 180 may include computing devices configured similarly to the server computing devices, with one or more processors, memory and instructions as described above. The memory may store map that includes information about various features that are likely to persist such as roads, lanes, lane lines and marker, traffic lights, crosswalks, buildings, road elevations, fire hydrants, construction zones, etc. as well as the attributes (location, relationships, rules, etc.) of these various features.

In addition, each of these vehicles may include a perception system that includes one or more components for detecting objects external to the vehicle such as other vehicles, obstacles in the roadway, traffic signals, signs, trees, etc. For example, a perception system may include one or more LIDAR sensors, sonar devices, radar units, cameras and/or any other detection devices that record data which may be processed by computing devices of the vehicle. The sensors of the perception system may detect objects in the external environment of the vehicle and generate sensor data describing characteristics of such objects such as location, orientation, size, shape, type, direction and speed of movement, etc. The raw sensor data from the sensors and/or the aforementioned characteristics can be quantified or arranged into a descriptive function or vector and sent for further processing to the vehicle's computing devices in order to combine with the map data to make driving decisions for the vehicles. The sensor data may also be stored as log data in a log of the memory of that vehicle.

As with memory 114, storage system 150 can be of any type of computerized storage capable of storing information accessible by the server computing devices 110, such as a hard-drive, memory card, ROM, RAM, DVD, CD-ROM, write-capable, and read-only memories. In addition, storage system 150 may include a distributed storage system where data is stored on a plurality of different storage devices which may be physically located at the same or different geographic locations. Storage system 150 may be connected to the computing devices via the network 160 as shown in FIG. 1 and/or may be directly connected to any of the computing devices 110, 120, 130, 140 as well as those of vehicles 170 and 180 (not shown).

Figure 3:
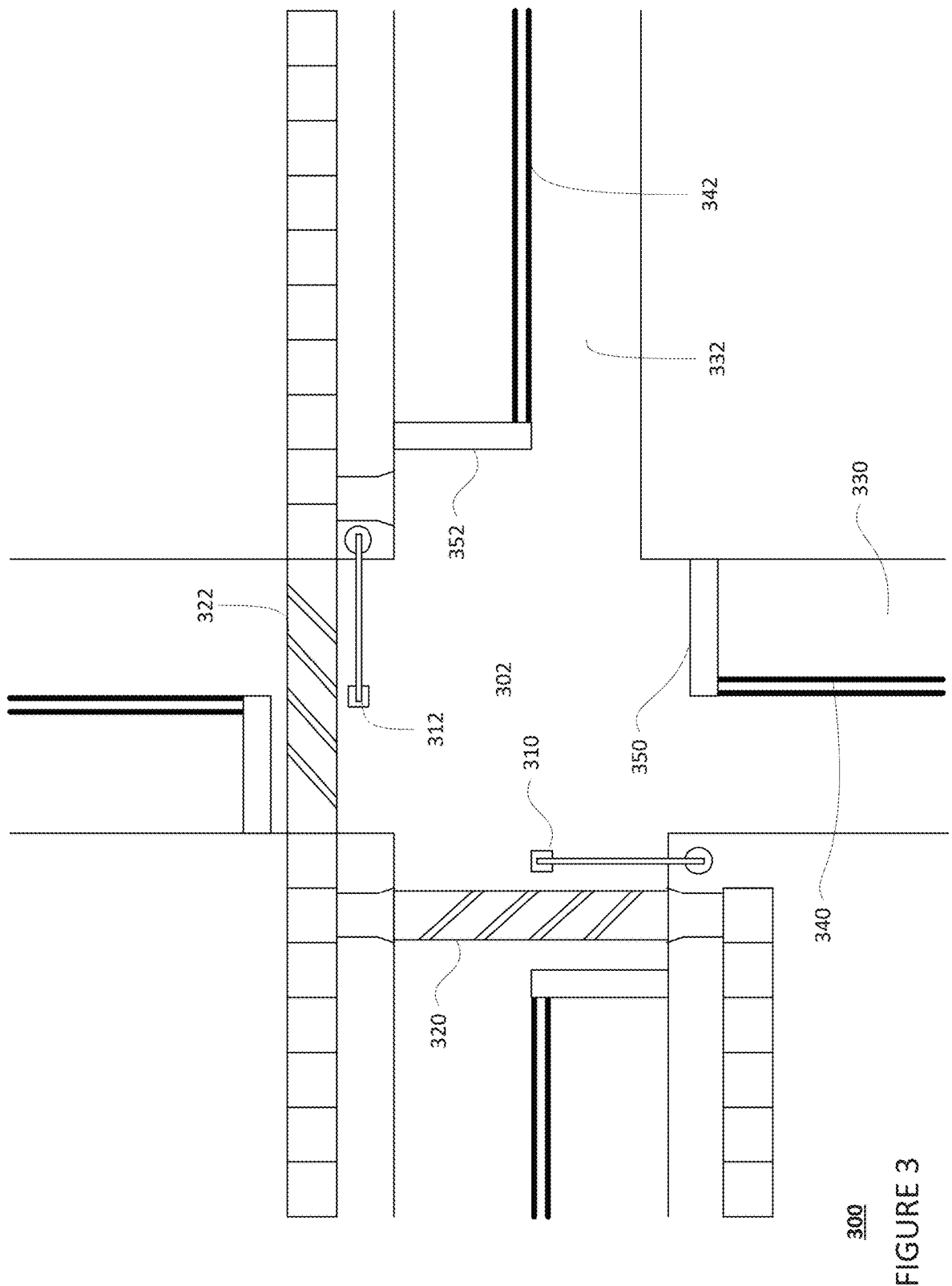
FIG. 3 is an example of map data in accordance with aspects of the disclosure.

Storage system 150 may store various data. For instance, storage system 150 may store map data, similar to the map data of the vehicles 170, 180 discussed above. FIG. 3 depicts an example of map data 300 including an intersection 302. In this example, the map data 300 includes the shape location and other attributes (not shown) of various features such as traffic lights 310, 312, crosswalks 320, 322, lanes or lane segments 330, 332 bounded by lane lines 340, 342 and stop lines 350, 352, and so on. As such, these features may be used by the computing devices of vehicles 170 and 180 to make driving decisions.

Storage system 150 may also store the aforementioned log data. Thus, this log data may include data collected by various sensors while attached to a vehicle. These sensors, for instance, such sensors may be mounted on a vehicle such as vehicles 170 and/or 180 which, as noted above, may store logs of the sensor data. The log data may be downloaded and/or uploaded to the storage system 150 via a wired or wireless connection (over network 160).

Storage system 150 may also store challenge questions. These challenge questions may be initially generated manually and associated with one or more triggers. The triggers may correspond to types of attributes of the map data as well as other nearby attributes as discussed further below. Each challenge question may be associated with image information identifying a perspective, location, etc. for retrieving and/or annotating an image to provide context for that challenge question. Challenge questions may also be associated with an "importance" value which indicates a level of importance of that question to the map quality as discussed further below.

In addition, the storage system 150 may store relationships or links between challenge questions. For instance, a challenge question may be linked to one or more other challenge questions in a hierarchy or tree based on the answer to that challenge question. Thus, one challenge question may lead to another challenge question and so on.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

In order to validate map data using challenge questions, an operator, such as operator 220, may use his or her client computing devices, such as client computing devices 120, 130, or 140, to communicate the server computing devices 110. For instance, the operator's client computing device may communicate with server computing devices 110 via a quality control application in order to initiate a validation session.

In response, the server computing devices may identify an attribute to be validated from the map data. For instance, the server computing devices may review new, old, or recently updated map data of storage system 150 in order to identify attributes which need to be validated. As an example, each new, old (such as several months, years, or more), and recently added attribute, such as the existence, location, and text of a sign, location and connection of lanes (i.e. whether two lanes or lane segments are connected to one another in space so as to allow a vehicle to proceed from one to the other, for instance, to make a turn or along a road), etc. may be initially marked as unverified or rather, that the attribute needs to be independently validated (i.e. by someone other than the computing device or operator who added the attribute). In some instances, validation may be required by one or more operators before the new or recently added features can be incorporated into the map used by vehicles 170, 180 in order to promote the safety of such vehicles.

Figure 4:
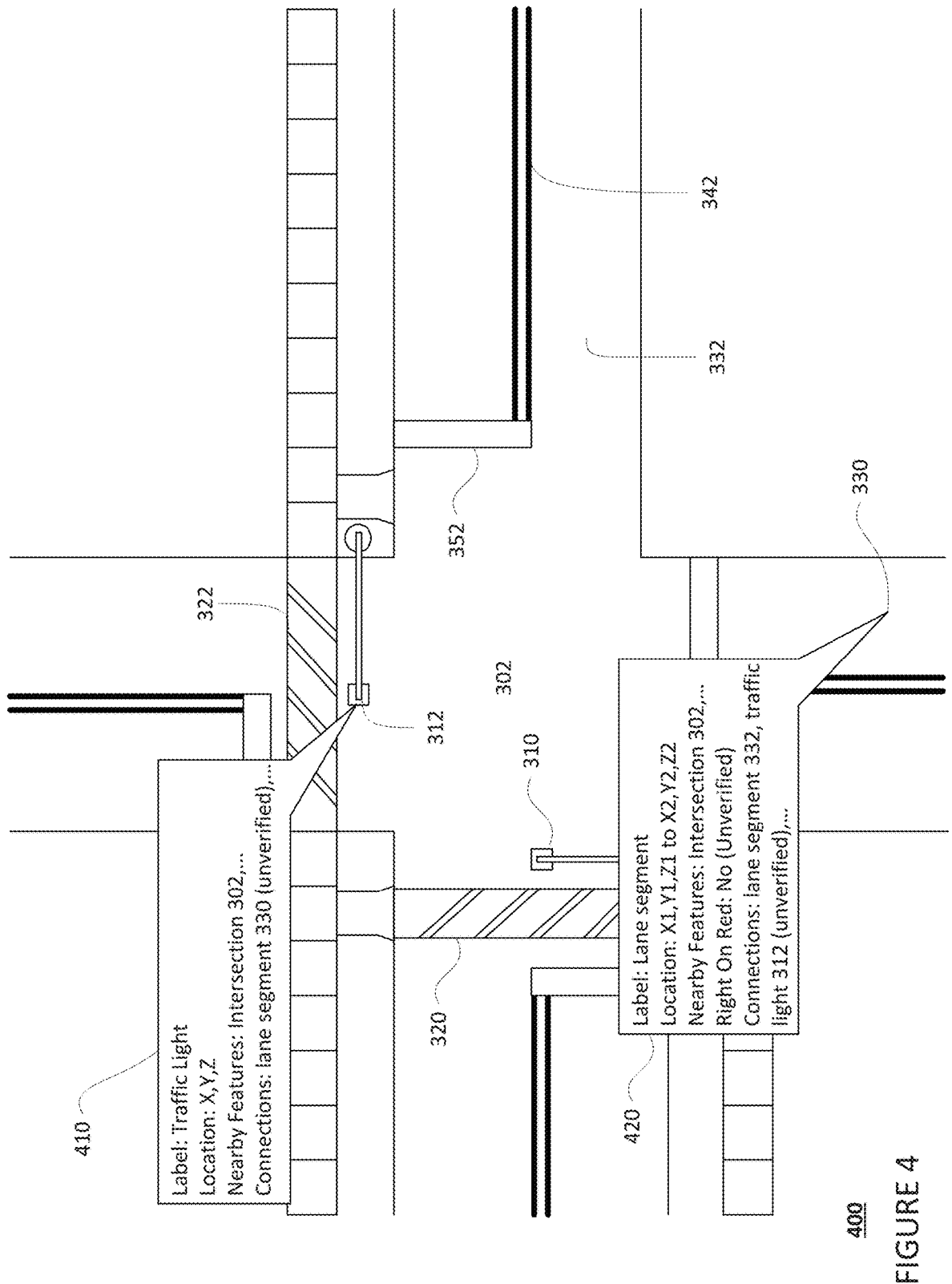
FIG. 4 is an example of map data and attributes in accordance with aspects of the disclosure.

For instance, FIG. 4 is an example 400 of the map data 300 with some example attributes for the features of lane segment 330 and traffic light 312. In this example, traffic light 312 includes attributes 410 such as a type (traffic light), a location (X,Y,Z), nearby features, and lane connections. In this example, the connection to lane segment 330 is marked as unverified. Lane segment 330 includes attributes 420 such as a type (lane segment), a location (X1,Y1,Z1 to X2,Y2, Z2), and nearby features. In this example, attributes 420 identify that from lane segment 330, a vehicle cannot make a right turn on a red light and that lane segment 330 is connected to traffic light 312 or rather, whether traffic light 312 controls traffic in lane segment 330. These two attributes are marked as unverified. As such, this attribute of attributes 420 may be identified as an attribute to be verified. Although FIG. 4 includes only two examples with only 4 or 5 attributes each, this is only for ease of understanding and simplicity. Each feature of the map data will have one or many more attributes, for instance, at least a type and a location (i.e. geographic coordinates).

For any identified attribute, the computing system may identify one or more challenge questions. Again, each attribute may be associated with a label identifying the type of that attribute. For instance, attributes 420 include the types of label, location, nearby features, connections and attributes 410 include the types of label, location, nearby features, right on red. As noted above, each type of attribute may be associated with one or more triggers which are further associated with one or more predetermined challenge questions. At least some of these triggers may be related to not only the attribute, but also to other attributes of the map within some distance, such as a few meters or more or less, from the location of the attribute.

For instance, if the map data includes an attribute such as a lane segment, that meets with an intersection where a vehicle could make a right turn, such as lane segment 330 which connects to lane segment 332 at intersection 302, this may trigger a challenge question such as "Are there any No-Right-On-Red signs for the right turn" or "Can a right turn on a red be made here?" This question can be especially important when the map data is generated from laser (LIDAR) data, as the text on a "No Turn on Red" sign would be missed (it would only be visible in a camera image). Other examples of challenge questions may include, "Does this light control my lane?" if the map data links a traffic light to a particular lane, "is this a speed bump?" if the map data includes a speed bump, if the map data does not identify any traffic lights at an intersection, "Does this traffic light relate to this lane?", "Does this intersection have any traffic lights?", or "Does this lane connect to this lane?" if the map data indicates a turn from one lane into another lane is possible. Thus, the server computing device 110 may select from a plurality of predetermined challenge questions at least one challenge question based on the identified attribute.

Figure 5:
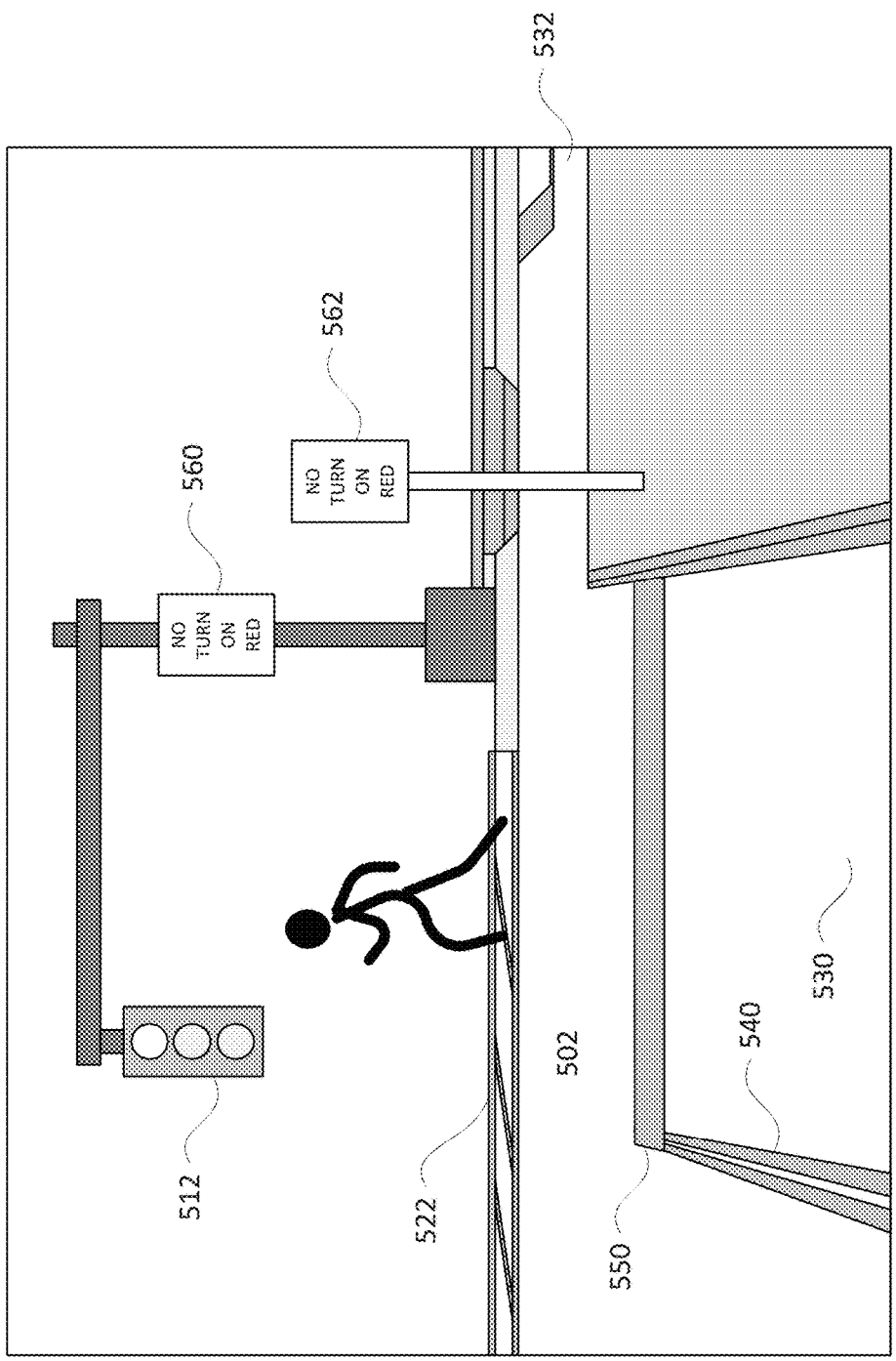
FIG. 5 is an example of an image in accordance with aspects of the disclosure.

In addition, for each selected challenge question, an image may be identified using the image information associated with the selected challenge question. This image information may include an angle or range of angles as well as a position or range of positions for an image that can be used to help an operator to answer the challenge question. In this regard, the server computing devices 110 may retrieve an image from log data based on the image information associated with the at least one challenge question. For instance, for the challenge question "Can I turn right on red here?", the image information may indicate that the server computing devices 110 should access the log data of the storage system 150 identify an image captured along the lane segment oriented towards the intersection and captured at least 5 meters or more or less from the intersection. FIG. 5 is an example image 500 captured at a location in lane segment 330, oriented towards intersection 302, and approximately 5 meters from intersection 302. In this example, various features are visible, including an intersection 502 (corresponding to all or part of intersection 302), traffic light 512 (corresponding to traffic light 312), crosswalk 522 (corresponding to crosswalk 522), lane segments 530, 532 (corresponding to all or part of lane segments 330, 332), lane line 540 (corresponding to lane line 340), stop line 550 (corresponding to stop line 350), and so on. In addition, two "No Turn on Red" signs 560, 562 are also visible.

Figure 6:
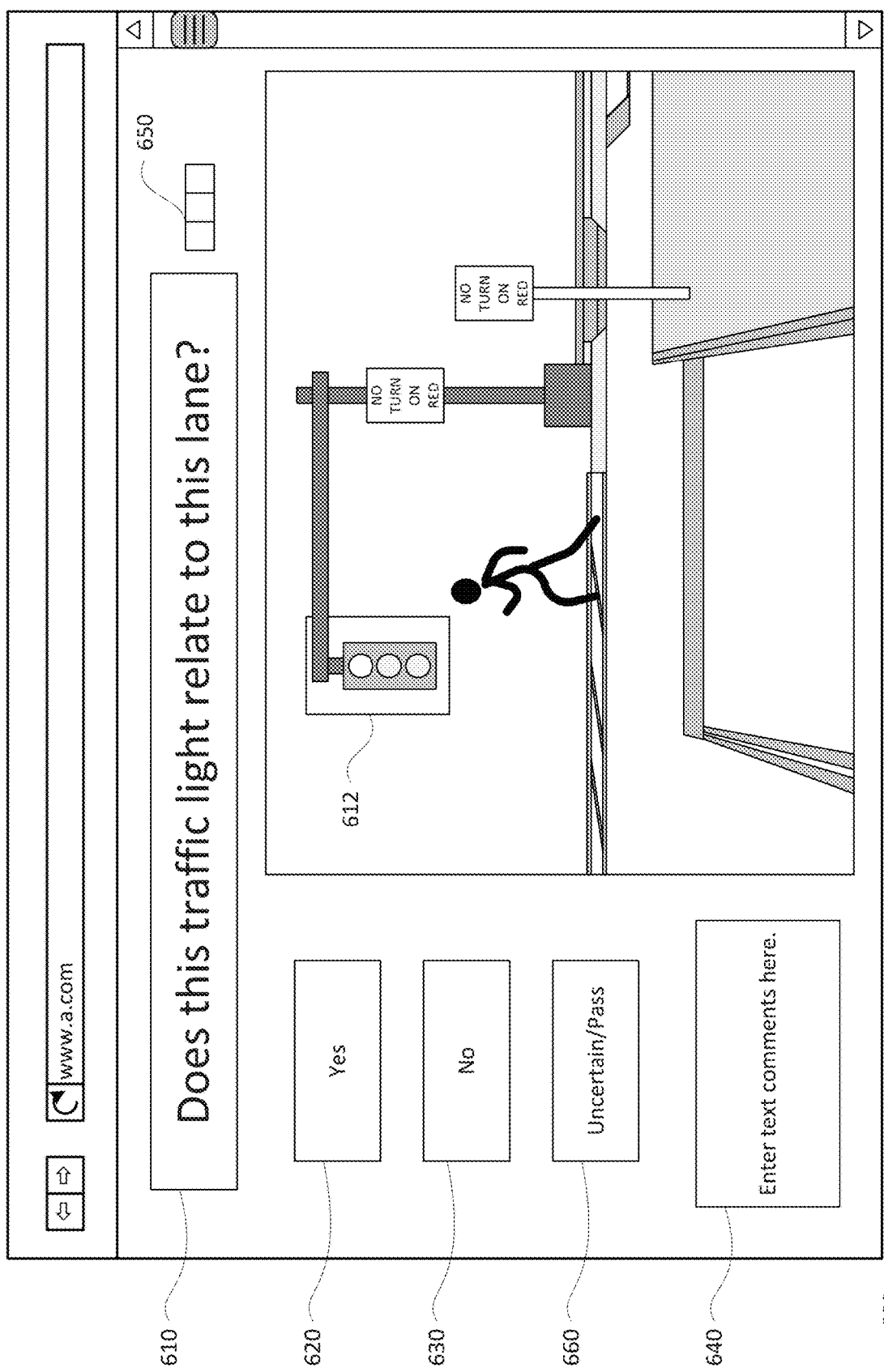
FIG. 6 is an example operator interface in accordance with aspects of the disclosure.

Once the one or more challenge questions are identified and the images retrieved, these may be provided by the server computing devices 110 to the client computing device. In other words, each challenge question and image may be displayed on a display with an operator interface generated by the application in order to allow the operator to answer the question. FIG. 6 is an example of an operator interface 600. In this example, image 500 is displayed immediately below challenge question 610 which is asked in order to verify the connection between lane segment 332 and traffic light 312. In this example, to make the question for the operator "clearer" the image 500 includes an annotation or bounding box identifying the traffic light 612 in order to provide context for the challenge question 610. The location of this bounding box may be determined and projected into image 500 using the location or other attributes of the traffic light 312 as well as the image information associated with the selected challenge question (i.e. associated with challenge question 610).

Once displayed, the operator may provide an answer to the at least one challenge question. For instance, for the challenge question 610 ("Does this traffic light relate to this lane?"), the operator interface may include options for answering, such as YES or NO options 620, 630, which the operator can select or click on with a mouse pointer, finger or stylus if a touch sensitive input, etc. The operator may also be able to enter comments, for instance, via comments box 640.

Thereafter, another challenge question and image may be provided for display to the operator and so on until the validation session is completed, the operator is finished, etc. In addition, the response or responses (i.e. which of options 620, 630, 660 was selected) which indicate the operator input identifying the answer, may be provided by the application and client computing device to the server computing device 110.

Figure 7:
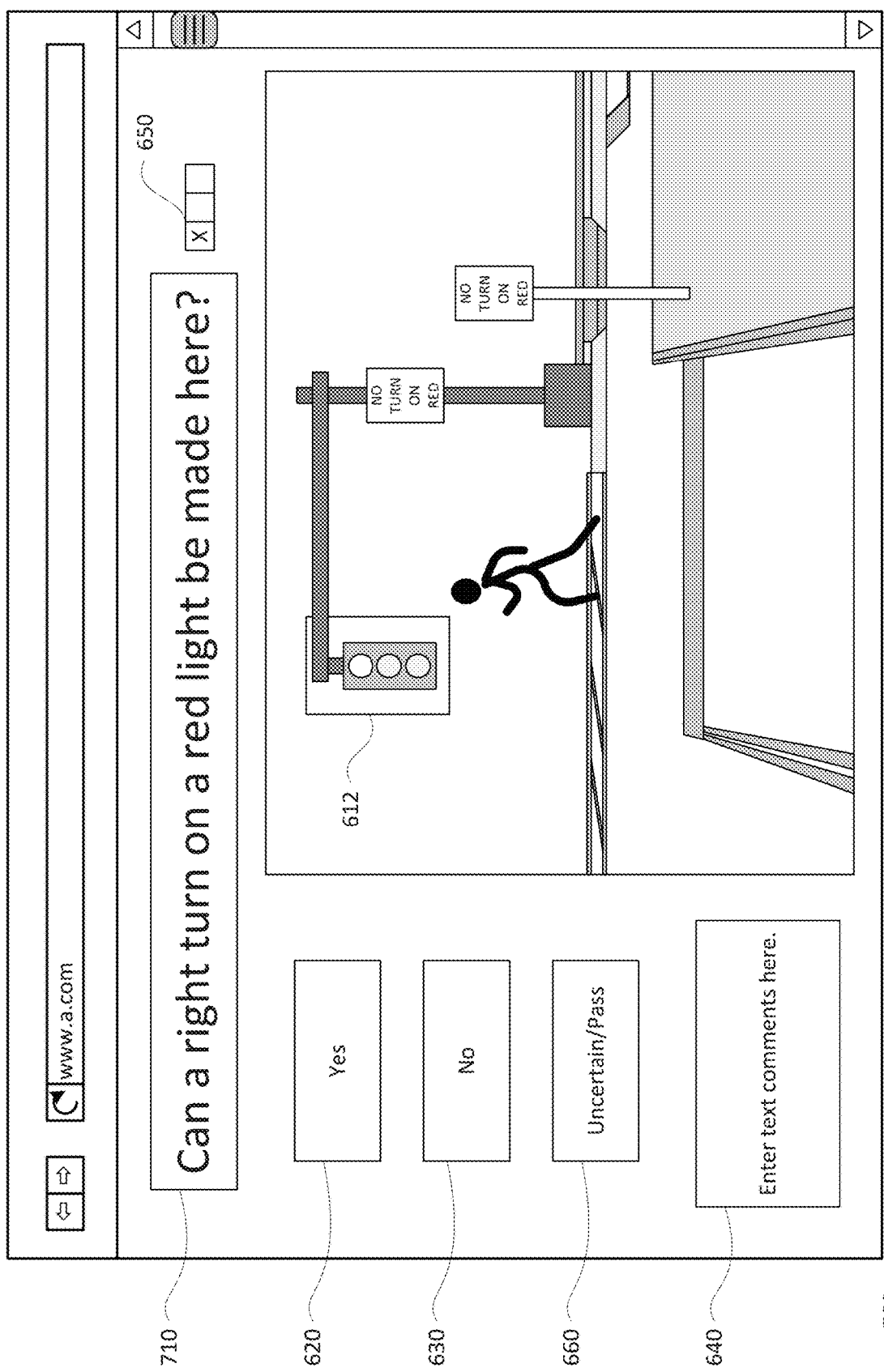
FIG. 7 is another example operator interface in accordance with aspects of the disclosure.

In some instances, more than one question may be displayed with a particular image. This may allow for the verification of multiple different attributes. For instance, as shown in the example operator interface 700 of FIG. 7, image 500 is displayed immediately below challenge question 710 which is asked in order to verify the whether a vehicle can make a right turn on a red light from lane segment 330 at intersection 302 ("Can a right turn on a red light be made here?"). Here, no additional context is provided. In such examples, the operator interfaces 600 and 700 may include a progress bar 650 to indicate the number of challenge questions asked, answered, and/or yet to be asked of the operator for a particular image. For instance, as can be seen between FIGS. 6 and 7, progress bar changes (i.e. increases its progress) after an operator answers the challenge question 610 of FIG. 6 and once the challenge question 710 is displayed.

The questions may be displayed in a predetermined order, for instance by order of importance value for each question. For instance, confirming connections of lanes to traffic lights may be more important than confirming right turns on red lights which may be more important than identifying and/or confirming locations of speed bumps. In this regard, challenge question 610 may be displayed prior to challenge question 710.

In some instances, the operator may be provided with tools. For instance, at least some of these tools may include tools for manipulating the image to better answer the challenge question, such as making the image brighter or darker or zooming into or out of the image. As another example, the operator may be provided with a tool (i.e. an option) to request a different image (for instance, one closer or one farther away) in order to assist the operator in answering the challenge question. The operator may also be able to pass on a particular question for any reason, such as if the question is unclear or somehow inapplicable or where the operator is simply unsure of the question, such as via option 660.

In addition, a challenge question may be linked to one or more other challenge questions, for instance in a hierarchy or tree based on the answer to that challenge question. Thus, one challenge question may lead to another challenge question and so on. For instance, challenge question 610 may be linked to challenge question 710. However, in order to ensure that the operator does not get too overwhelmed or bored, the number of questions asked of any given operator for any given attribute may be limited in number, for instance, no more than 5 or more or less. If there are additional challenge questions, they may be displayed to another operator or at a different time (e.g. at a different validation session).

Figure 8:
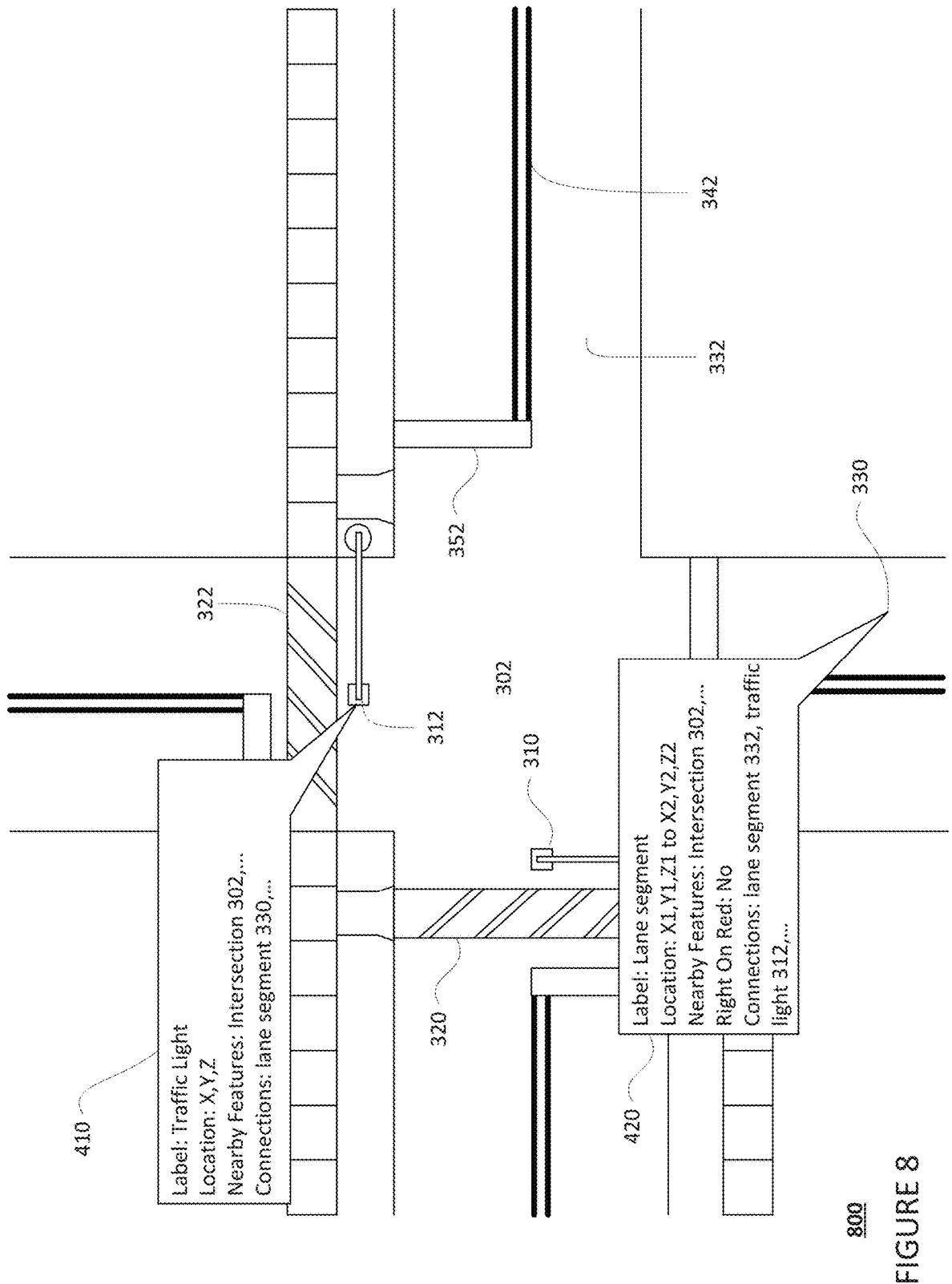
FIG. 8 is an example of map data and attributes in accordance with aspects of the disclosure.

The answers to the challenge questions can then be analyzed to validate the map data. For instance, the answer may be used to confirm that the attribute is correct as well as to determine how or whether to correct or update the map data. As an example, in response to challenge questions 610 and 710, an operator may have inputted "YES" via option 620. In response, the server computing devices may no longer mark the corresponding attributes for those challenge questions 800 as unverified. For instance, shown in example 800 of FIG. 8, the connection between lane segment 330 and traffic light 312 is no longer marked as not verified in attributes 410 and 420. Similarly, the "right on red" attribute of attributes 420 is no longer marked as unverified. Once the map data has been validated, this map data may then be sent, for instance via network 160 or direct download, to vehicles 170, 180 in order to be used to allow those vehicles to make informed, safer driving decisions.

Although the above relates to specific relationships between attributes of the map data, the answers to the challenge questions could also be used for other information which might indicate that the world has changed with respect to the map data in some other way, such as confirming construction areas at intersections.

In addition, the same challenge questions may be asked of different operators in order to compare the results and measure the accuracy of individual operators in reviewing specific types of attributes. For instance, if a threshold minimum number of operators (such as 2 or 10 or more or less) or a percentage of operators (such as 4 out of 5 or 80% or more or less) answer the same challenge question the same way, this may be sufficient to use the answer to correct or update the map data. In addition, the level of redundancy, or how many times the same question is asked, may be tied to the importance of the answer being correct.

The answers may also be used as labels for machine learning models or applications. For instance, the answers, the challenge questions, the images, and the map data may be used to train a model for future map quality control. Thereafter, other map data and images may be input into the model in order to generate answers to challenge questions.

The aforementioned challenge questions with camera images are useful for reviews as the images provide a perspective very similar to the perspective of driving. However, challenge questions can be asked using any kind of data. It could be a top-down map view, so long as the question is specific to the information provided by the top-down view, or even 3D laser scans generated by a LIDAR sensor.

Figure 9:
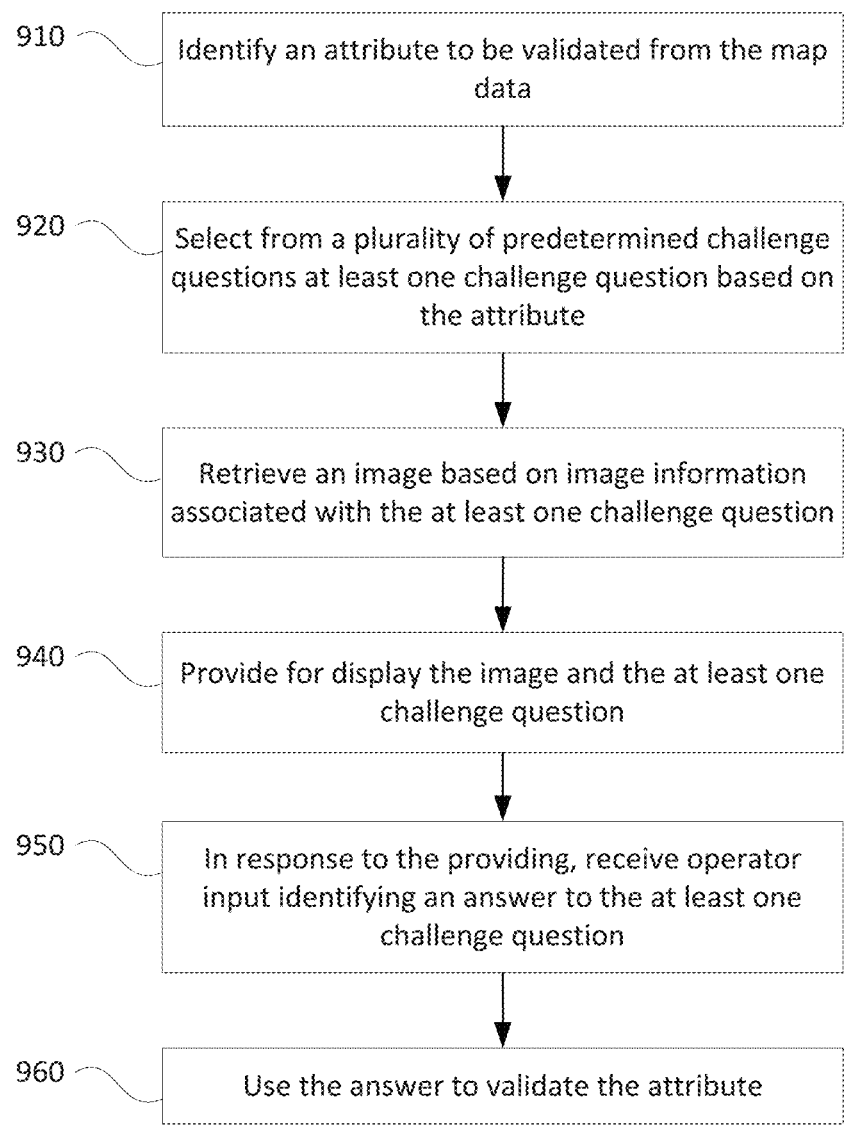
FIG. 9 is a flow diagram in accordance with aspects of the disclosure.

Flow diagram 900 of FIG. 9 is an example flow diagram of some of the aspects described above that may be performed by one or more computing devices such as server computing devices 110 in order validate map data using challenge questions. For instance, at block 910 an attribute to be validated is identified from the map data. At block 920, at least one challenge question is selected from a plurality of predetermined challenge questions based on the attribute. At block 930, an image is retrieved based on image information associated with the at least one challenge question. At block 940, the image and the at least one challenge question are provided for display. At block 950, in response to the providing, operator input identifying an answer to the at least one challenge question is received. This answer is then used to validate the attribute at block 960.

The features described herein provide for improved map quality and detail. The questions may be tailored to address questions of high importance with respect to how the map is going to be used. In other words, the questions can be used to guide the attention of the operator to checking specific attributes by identifying and displaying appropriate questions. Having such specific, tailored questions may provide fine-grained details about types of errors, mistakes, or omissions in the map data and are more likely to generate reliable answers than open-ended questions such as identify or list any mistakes. Together this information may be used to proportionally focus quality control effort on mapping errors that are most important to the behavior of vehicles. In addition, the types and numbers of questions asked is a "knob" that can be turned to affect map quality in a targeted way.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order, such as reversed, or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for validating map data used by one or more vehicles to operate, the method comprising:
   accessing, by one or more processors, the map data from memory;
   identifying, by the one or more processors, an attribute to be validated based on the map data, the attribute being marked as needing to be independently validated;
   selecting, by the one or more processors, from a plurality of predetermined challenge questions at least one challenge question based on the attribute;
   retrieving, by the one or more processors, an image based on image information associated with the at least one challenge question;
   providing for display to an operator, by the one or more processors, the image and the at least one challenge question;
   in response to the providing, receiving, by the one or more processors, input from the operator identifying an answer to the at least one challenge question;
   validating, by the one or more processors, the attribute by confirming that the attribute is correct based on the answer to the at least one challenge question;
   upon validating the attribute, the one or more processors removing the marking to update a status of the attribute;
   sending, by the one or more processors, validated map data including the validated attribute to the one or more vehicles, wherein the one or more vehicles make driving decisions based on the validated map data; and
   operating, by the one or more processors, the one or more vehicles in accordance with the driving decisions.

2. The method of claim 1, wherein the attribute corresponds to whether a right turn during a red light is permitted at an intersection.

3. The method of claim 1, wherein the image information defines instructions for retrieving a camera image from log data.

4. The method of claim 3, wherein the instructions identify an angle and a position for the camera image.

5. The method of claim 1, further comprising, providing options for the operator to zoom in or out of a displayed image.

6. The method of claim 1, further comprising, providing an option for the operator to request another image in order to answer the at least one challenge question.

7. The method of claim 1, wherein the at least one challenge question requests the operator to verify whether the one or more vehicles are permitted to make a right turn during a red light at an intersection.

8. The method of claim 1, wherein the at least one challenge question requests the operator to verify whether a particular traffic light controls traffic in a particular lane.

9. The method of claim 1, wherein the at least one challenge question requests the operator to verify whether an intersection has any traffic lights.

10. The method of claim 1, further comprising comparing the answer to other answers received for the at least one challenge question, and wherein validating the map data is further based on the comparing.

11. The method of claim 10, wherein validating the attribute is further based on a total number of consistent answers from the answer and the other answers.

12. The method of claim 11, wherein validating the attribute is further based on comparing the total number of consistent answers to a threshold value.

13. The method of claim 1, further comprising, using the answer to correct the map data.

14. The method of claim 1, further comprising using the answer as a label for input into a machine learning model in order to train the machine learning model to verify other map data.

15. The method of claim 14, further comprising using the machine learning model to verify the other map data.

16. The method of claim 1, further comprising providing for display to the operator, a progress bar indicating at least one of a number of challenge questions that have been asked, a number of challenge questions that have been answered, or a number of remaining challenge questions to be asked.

17. A system for validating map data used by one or more vehicles to operate, the system comprising:
   a memory device; and
   one or more processors configured to:
      access map data from the memory device;
      identify an attribute to be validated based on the map data, the attribute being marked as needing to be independently validated;
      select from a plurality of predetermined challenge questions at least one challenge question based on the attribute;
      retrieve an image based on image information associated with the at least one challenge question;

provide for display to an operator the image and the at least one challenge question;

in response to the providing, receive input from the operator identifying an answer to the at least one challenge question;

validate the attribute by confirming that the attribute is correct based on the answer to the at least one challenge question;

upon validating the attribute, remove the mark to update a status of the attribute;

send validated map data including the validated attribute to the one or more vehicles, wherein the one or more vehicles make driving decisions based on the validated map data; and operate the one or more vehicles in accordance with the driving decisions.

18. The system of claim 17, wherein the attribute corresponds to whether a right turn during a red light is permitted at an intersection.

19. The system of claim 17, wherein the image information defines instructions for retrieving a camera image from log data.

20. The system of claim 17, wherein the one or more processors are further configured to compare the answer to other answers received for the at least one challenge question, and to validate the map data is further based on the comparison.

21. The system of claim 17, the one or more processors are further configured to provide for display to the operator, a progress bar indicating at least one of a number of challenge questions that have been asked, a number of challenge questions that have been answered, or a number of remaining challenge.

* * * * *

UNITED STATES PATENT AND TRADEMARK OFFICE
CERTIFICATE OF CORRECTION

| | | |
|---|---|---|
| PATENT NO. | : 11,181,384 B2 | Page 1 of 1 |
| APPLICATION NO. | : 16/042184 | |
| DATED | : November 23, 2021 | |
| INVENTOR(S) | : Michael Steven Montemerlo, Ming Ji and Peter Pawlowski | |

It is certified that error appears in the above-identified patent and that said Letters Patent is hereby corrected as shown below:

In the Claims

Claim 21, Column 14, Line 16:
Now reads: "remaining challenge."; should read -- remaining challenge questions to be asked. --

Signed and Sealed this
Fifth Day of July, 2022

Katherine Kelly Vidal
*Director of the United States Patent and Trademark Office*